Patented June 27, 1939

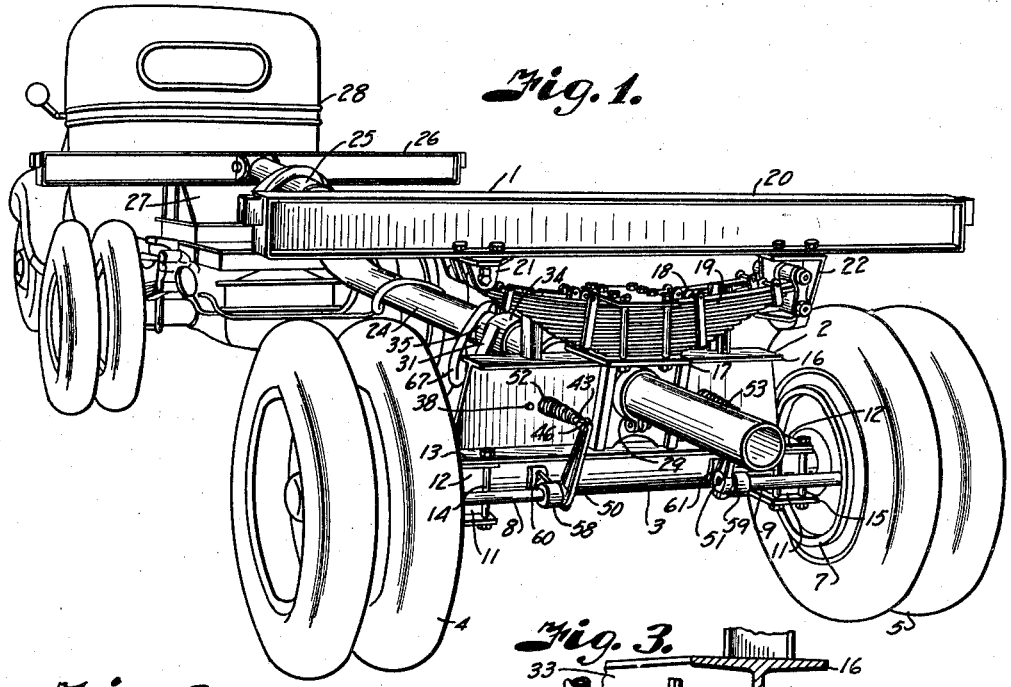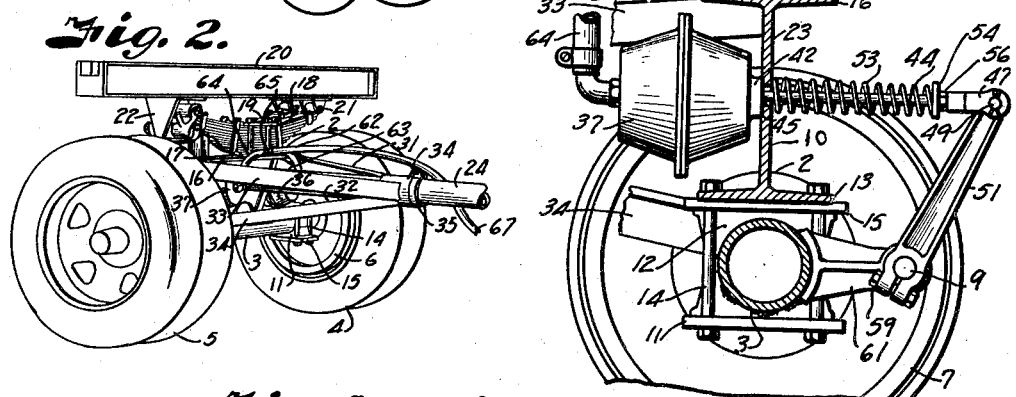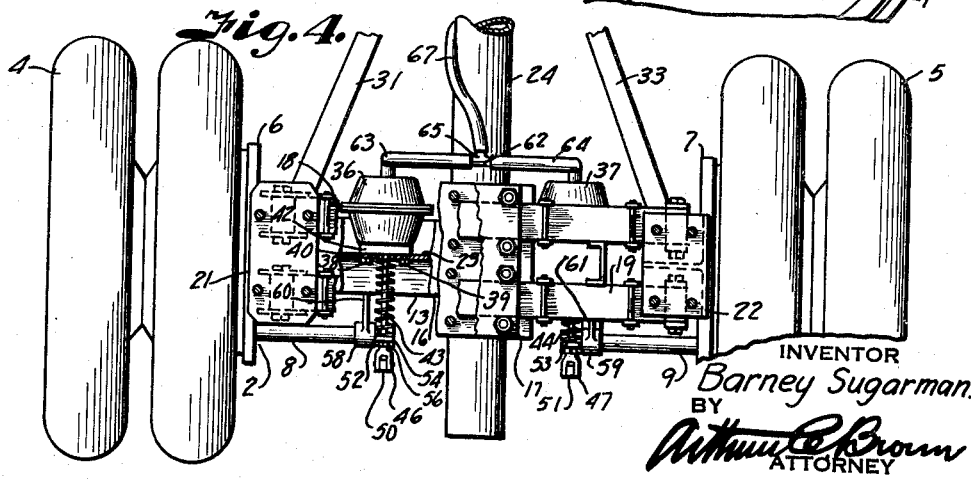

2,163,896

UNITED STATES PATENT OFFICE 2,163,896

BRAKE CYLINDER MOUNTING FOR VEHICLES

Barney Sugarman, Fort Smith, Ark., assignor to Fort Smith Structural Steel Company, Fort Smith, Ark., a corporation of Arkansas Application November 30, 1936, Serial No. 113,282

3 Claims. (Cl. 188—152)

This invention relates to brake cylinder mountings for trailers and similar vehicles. In vehicles of this character the brake cylinders are ordinarily mounted in such positions that they are very apt to be put out of commission incidental to the ordinary usage to which the vehicles are subjected with the result that the braking system is usually out of service.

It is, therefore, the principal object of the present invention to provide a brake cylinder mounting whereby the brake cylinders are housed within and protected by the axle unit It is also an important object of the invention to provide a brake operating mechanism that is rigidly mounted and completely carried by the axle unit.

In accomplishing these and other objects of the invention, as hereinafter pointed out, I have provided improved details of structure, the preferred form of which is illustrated in the accompanying drawing, wherein:

Fig. 1 is a perspective view of a trailer vehicle equipped with a braking apparatus and cylinder mounting embodying the features of the present invention.

Fig. 2 is a detail perspective view of the axle unit showing the mounting of the brake cylinders within the protective confines of the axle unit.

Fig. 3 is a section through the axle unit showing mounting of the brake cylinders and actuating levers.

Fig. 4 is a plan view of the axle unit, a part of which is broken away to better illustrate the cylinder mounting.

Referring more in detail to the drawing:

1 designates a vehicle including a gear axle unit 2 comprising an axle 3 carrying dual wheels 4 and 5 having conventional brakes indicated by the housings 6—7 and the operating shafts 8 and 9. Mounted on the axle 3 is a frame member or sill 10 preferably of I-beam shape, and which has its ends attached to the axle through clamping members 11 and 12. The lower members 11 are welded to the under side of the axle and the upper members are mounted upon the axle to form seats for the sill. The members 11 and 12 are secured together and to the base flange 13 by bolts 14 extending through suitable openings in the base flange and through flanges 15 formed on the clamping members as best shown in Fig. 3.

Mounted on the upper flange 16 of the sill is a spring seat 17 to which are anchored a pair of elliptical springs 18 and 19 supporting a bolster 20, one end of the springs being pivotally connected with a bracket 21 fixed to the bottom of the bolster while their other ends are shackled to a bracket 22 also carried by the bolster.

Extending through an opening provided in the web 23 of the sill is a reach pole 24 having an upwardly offset forward end 25 connected with a front bolster 26 that is carried by the fifth wheel 27 on a tractor vehicle 28. The rear end of the reach pole is adjustably retained in the sill 9 by means of a clamp collar 29 that is clamped about the pipe to engage the rear side of the web 23. The ends of the axle as well as the sill are braced from the reach pole by radius rods 30—31 and 32—33 respectively having their forward ends connected to a collar 34 that is slidable on the reach pole and engaged by a clamp collar 35 that cooperates with the clamp collar 29 previously described, to fix the spacing of the axle unit relatively to the tractor.

36 and 37 designate pairs of brake cylinders of any conventional design, which are secured to the web of the sill 9 on opposite sides of the reach pole and within the protecting confines of the radius rods 31—32 and 33—34 and the upper and lower flanges of the sill as best shown in Figs. 2 and 3. The cylinders are attached to the web of the sill by cap screws 38 and 39 that have their shanks projected through openings 40 in the web and into threaded sockets of mounting blocks 42 formed as a unitary part of the brake cylinders. The actuating shafts 43 and 44 of the cylinders extend through openings 45 in the web at a point between the fastening devices and carry yoke shaped heads 46 and 47 that are pivotally connected by means of pins 49 with the free ends of rock levers 50 and 51 that are rigidly secured to the brake actuating shafts 6 and 7.

The brakes are normally retained in released position by means of coil springs 52 and 53 sleeved on the rods 43 and 44 respectively and have one of their ends bearing against the web and the other ends against collars 54 that bear against lock nuts 56 on the rods. In order to enhance rigidity of the operating shafts 6 and 7, the outer ends carrying the levers 50 and 51 are rotatably mounted in bearings 58 and 59 carried by arm-like brackets 60 and 61 that are welded to the axle 3 as best shown in Fig. 3. The brake cylinders are supplied with an actuating medium through a manifold pipe 62 having branches 63 and 64 leading to the respective cylinders. The manifold is provided with a T fitting 65 which is connected with a flexible conduit 67 through which the actuating medium is supplied from the tractor vehicle as in conventional practice.

When the actuating medium is rendered effective in the cylinders, the shafts 43 and 44 are drawn retractively against action of the springs to rock the operating shafts 6 and 7 to effect setting of the brakes. When the actuating medium is released the springs become effective to rock the operating shafts in reverse direction to release braking action on the wheels.

With the brake cylinders mounted on the web of the sill at the respective sides of the reach pole and within the protecting confines of the radius rods, any objects that might disrupt the braking cylinders are deflected by the radius rods so that the cylinders remain in serviceable condition throughout the life of the vehicle.

What I claim and desire to secure by Letters Patent is:

1. In a vehicle of the character described, an axle, wheels carried by the axle, brakes controlling rotation of the wheels, an apertured sill member supported upon the axle and extending parallel therewith, a reach pole connected with the sill member and extending forwardly therefrom, radius rods connecting the outer ends of the sill member with the reach pole, brake cylinders carried on the front of the sill member and within the respective angles formed between the reach pole and sill member whereby the radius rods, reach pole and sill member form a substantially triangular-shaped guard for protecting the brake cylinders, operating rods projecting from the cylinders and extending through the apertures in the sill member to the rear side thereof, brake shafts having rotary support on the rear side of the axle, and levers on the brake shafts having connection with the operating rods.

2. In a vehicle of the character described, an axle, wheels carried by the axle, brakes controlling rotation of the wheels, a sill member having upper and lower flanges and a connecting apertured web supported upon the axle and extending parallel therewith, a reach pole connected with the sill member and extending forwardly therefrom, radius rods connecting the outer ends of the sill member with the reach pole, brake cylinders respectively carried on the front of said web between said flanges and within the angles formed between the reach pole and the sill member whereby the radius rods, reach pole and sill member form a substantially triangular-shaped guard for protecting the brake cylinders, operating rods projecting from the cylinders and extending through said apertures in the sill member to the rear side thereof, brake shafts having rotary support on the rear side of the axle, and levers on the brake shafts having connection with the operating rods.

3. In a vehicle of the character described, an axle, wheels carried by the axle, brakes controlling rotation of the wheels, a sill member supported upon the axle and extending parallel therewith, a reach pole connected with the sill member and extending forwardly therefrom, radius rods connecting the outer ends of the sill member with the reach pole to form substantially triangular shaped spaces guarded by said radius rods on one side and the sill member on the other relatively to travel of the vehicle, brake actuating mechanisms for said brakes, and means supporting said mechanisms within said triangular spaces.

BARNEY SUGARMAN.